United States Patent [19]

Francis, Jr. deceased

[11] Patent Number: 4,597,874

[45] Date of Patent: Jul. 1, 1986

[54] TREATMENT OF OIL WELL PRODUCTION

[75] Inventor: Alex W. Francis, Jr. deceased, late of Tulsa, Okla., by First National Bank and Trust Company, executor

[73] Assignee: Combustion Engineering, Inc., Windsor, Conn.

[21] Appl. No.: 709,146

[22] Filed: Mar. 7, 1985

Related U.S. Application Data

[63] Continuation-in-part of Ser. No. 574,312, Jan. 27, 1984, Pat. No. 4,555,332.

[51] Int. Cl.⁴ .............................................. B01D 17/025
[52] U.S. Cl. .................................... 210/708; 210/744; 210/805; 210/104; 210/DIG. 5; 208/188; 166/267
[58] Field of Search ............... 210/708, 787, 802–805, 210/104, 112, 259, 521, 522, 540, 519, DIG. 5, 744; 208/188; 166/265, 266, 267

[56] References Cited

U.S. PATENT DOCUMENTS

| | | | |
|---|---|---|---|
| 3,245,466 | 4/1966 | Hitzman | 166/266 |
| 3,507,782 | 4/1970 | Strausser et al. | 208/188 |
| 4,031,007 | 6/1977 | Sierra, Jr. | 210/DIG. 5 |
| 4,048,069 | 9/1977 | Cuvillier et al. | 210/522 |
| 4,216,079 | 8/1980 | Newcombe | 208/188 |
| 4,308,136 | 12/1981 | Warne, Jr. | 210/DIG. 5 |
| 4,364,833 | 12/1982 | Loegeaaine | 210/521 |
| 4,416,767 | 11/1983 | Jordan | 210/219 |
| 4,425,239 | 1/1984 | Jacocks et al. | 210/DIG. 5 |

FOREIGN PATENT DOCUMENTS 2092015  8/1982  United Kingdom ......... 210/DIG. 5

Primary Examiner—John Adee

[57] ABSTRACT

Saline-tolerant surfactant is utilized in tertiary recovery of oil. The surfactant is concentrated in a portion of the produced oil and water and is recovered by the use of a cosolvent and fresh water. Both the cosolvent and surfactant are reclaimed for reuse, while the oil is released for sale.

3 Claims, 3 Drawing Figures

TREATMENT OF OIL WELL PRODUCTION

This application is a Continuation-In-Part of application Ser. No. 574,312 filed Jan. 27, 1984, U.S. Pat. No. 4,555,332.

TECHNICAL FIELD

The present invention relates to separating the oil and water produced by flooding in secondary recovery of a formation. More particularly, the invention relates to the recovery of a surfactant used in the flood, along with any cosolvent required for surfactant recovery.

BACKGROUND ART

Most current and nearly all past oil production methods leave as much as 50% of the original oil in place. Recent efforts to recover that oil remaining in the reservoirs have had considerable success. Among the more promising of the methods being used today is an enhanced oil recovery process referred to as a surfactant flood. This chemical method has brought with it some very difficult oil dehydration problems. These problems are the direct result of the chemicals used in the reservoir to improve the movement of the oil out of the reservoir rock and into the producing wells. In the normal water-flood phase of producing oil from the reservoir, much of the oil in place remains because of the high interfacial tension between the oil and water. The droplets of oil will not flow freely through the capilaries in the reservoir rock. To overcome this mobility problem, producers are adding surface-active agents to the flooding fluids. These surface agents, called surfactants, reduce the interfacial tension between the oil and water. Stable micelles are formed between the oil and water and these micelles flow through the pores of the reservoir rock, moving the oil and water to the producing wells. The surfactant is the emulsifying agent and the presence of that surfactant in the produced fluids makes the subsequent oil and water separation very difficult in surface facilities. The very chemical features that produce success downhole makes the normal oil and water separation difficult. This is one of the problems that require new and different systems to accomplish the treatment of oil to make it salable and useful.

In field tests run by Shell Development Co. and reported in the December, 1977 Oil and Gas Journal, tracer response studies showed how much channeling of flow from the inlet to outlet occurs in the present separation devices used in oil and water separation processes. The hydraulic efficiency of large tanks used as oil and water separation devices proved to be very low, in the range of 5% or less. Because the separation of the oil and water is so difficult in the surfactant flood-produced fluids, good hydraulic efficiency is a must for the vessels used in the separation process. The system of the present invention offers a practical method of accomplishing oil and water separation in fluids produced by the surfactant flooding process. More broadly, the present invention enables the treatment of a large number of difficult-to-treat emulsions of secondary recovery, regardless of whether there is an element such as surfactant to be recovered and recycled.

Enhanced oil recovery processes, such as surfactant flooding, or fire flooding, that inject or generate chemicals that reduce the surface tension between oil and water, create rather difficult-to-treat emulsion problems. The surface tension reducers may be manufactured external to the reservoir and then injected; others may be a by-product of a reaction in the reservoir, such as fire flooding. From whatever source, these surface tension reducers cause a new set of problems not normally encountered in the on-surface processing of reservoir fluids. One pressing problem is that of the difficult-to-resolve emulsions both of the oil-in-water, and water-in-oil types. Another problem encountered is the wide variation in the volume and the stability of the emulsions produced over the life of the reservoir flooding operation.

When the tertiary operation first begins to respond to the new stimulus, the fluids produced may show an increase in uncontaminated oil that is relatively free of the emulsion-causing surfactants. As more and more of the reservoir fluids are produced, the character of the fluids coming from the stimulus of the surfactant action will be reflected in the emulsifying effects between the oil and water. During the early phase of the reservoir stimulus, the fluids are routinely prepared for sales and disposal with the conventional methods of oil and water separation and cleanup. As soon as the initial portion of uncontaminated oil is produced, the subsequently produced reservoir fluids become increasingly more difficult to prepare for sale and/or disposal, as the percentage of surfactant-containing fluids increase. The surfactant contamination varies as the surfactant front moves through the reservoir. As the surfactant front passes, the wells producing the fluid see an increase in surfactant contamination to an average maximum percentage equal to that which was injected into the reservoir when the flood was started. After the surfactant front passes the producing wells, the surfactant-laden fluids reduce as the flood progresses. The produced fluids again become more easily separated. A process for handling these reservoir fluids of varying characteristics should be designed to take advantage of these changes. The process system should be able to segregate the easy-to-treat oil and water from the difficult-to-treat oil and water.

In today's practice of enhanced oil recovery using chemical assistance, such as surfactants, the trend is to use surfactants that have saline tolerance. Most of the reservoirs which are candidates for use of surfactant-assisted enhanced oil recovery have been water-flooded for secondary oil recovery purposes. The connate water may have monovalent and divalent concentrations totalling over 100,000 parts/million. The water of injection that mixes with the surfactant may be to the order of 70,000 ppm. The new saline-tolerant surfactants are not influenced by salt levels of this magnitude. The oil-in-water emulsification takes place readily and the emulsion is not broken by the antagonistic effect of the monovalent or divalent ions in the salt water, as explained in Coffman U.S. Pat. No. 4,029,570. In these systems that use saline-tolerant surfactants, some other assistance, other than brine, must be used to coadunate the oil droplets in the oil-in-water emulsion. The oil droplets must be united before the separation process can begin. As related in the SPE paper No. 11985, presented by J. W. Ware in October, 1983, it was necessary to use 600 to 650 ppm of an additive generally referred to as a reverse-acting treating compound to assist in the coadunation of the dispersed small oil droplets. These so-called reverse-treating compounds are generally classed as water soluble polymers that are active at the oil-water interface to provide the antagonistic effect needed to cancel the effect of the surfactant. The water-soluble polymers provide the assistance needed to break the emulsions created by the saline-tolerant surfactants. This action is much like the action of concentrated brine described by Coffman supra and Newcombe, U.S. Pat. No. 4,216,079. Newcombe describes his laboratory experiments where he used very high concentrations of brines to obtain the monovalent and divalent ion antagonistic effect needed to resolve the oil-in-water emulsion.

In the present disclosure, the well fluids which have been emulsified by saline-tolerant surfactants, are concentrated into three portions: (1) a low-surfactant content oil that can be made salable with the conventional oil and water separation means, (2) a surfactant-rich oil and water emulsion in which the surfactant must be removed before the oil and water can be separated to make the oil salable, and (3) the third portion which is produced water with an oil remnant of perhaps 500 ppm or less which can be substantially removed by an efficient skimming process vessel. After the three portions are generated, the troublesome surfactant-rich portion can be given specific attention. The surfactant in the oil must be removed so that a separation of the oil and water can be accomplished. It is important to reduce the volume of troublesome surfactant-rich emulsion to the lowest value that can be accomplished in a practical manner, since the cosolvents that can dissolve the surfactant and remove it from the oil are not inexpensive, and the losses of the cosolvent in the separation operation are a function of the volume of surfactant-rich emulsion and its surfactant content. After the surfactant-rich emulsion portion of the well stream is concentrated, it is withdrawn from the concentration system and mixed with a cosolvent as taught in the ASTM Procedure D855 for "Analysis of Oil-Soluble Sodium Petroleum Sulfonates" to extract petroleum sulphates from oil to determine the equivalent weight of the sulfonate. This procedure demonstrates the ability of a cosolvent, such as diluent isopropanol, to selectively dissolve the surfactant from the oil of the surfactant-rich emulsion.

DISCLOSURE OF THE INVENTION

The present invention contemplates a recovery process in which a saline-tolerant surfactant is recovered for reuse in flooding a producing formation.

The invention further contemplates analyzing a saline-tolerant surfactant-rich emulsion to determine the amount of surfactant in the emulsion as a guide to the optimum ratio of cosolvent and fresh water to form a solution for mixing with the emulsion to break the bond of the oil and cause the surfactant to be dissolved in the water.

The invention further contemplates the process also includes recovering the cosolvent used in the surfactant recovery.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

Generalizations

Figure 1:
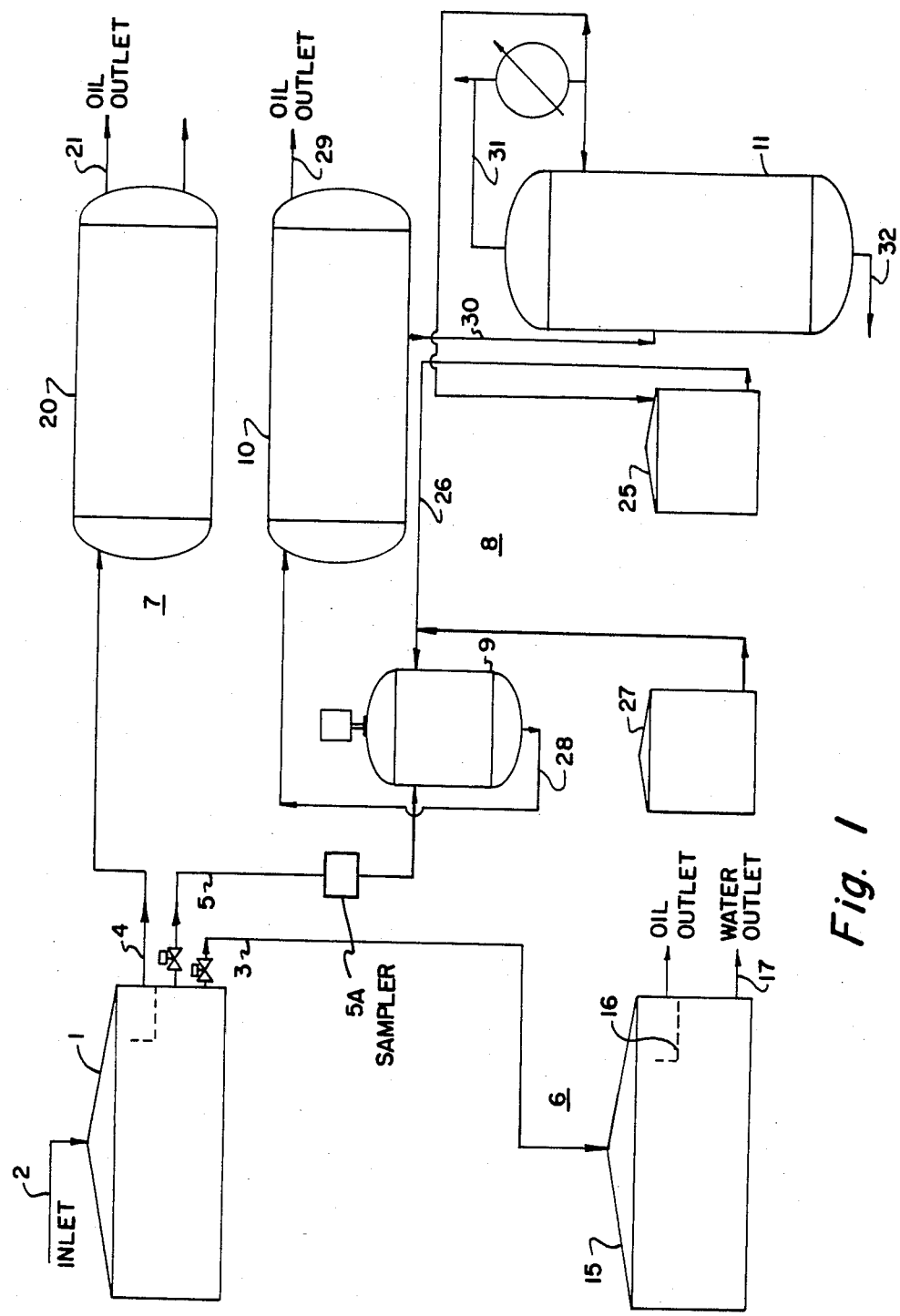
FIG. 1 is a schematic of a system for stratifying surfactant flood production and separately processing each stratum, as embodied in the present invention.

The principal object of the present invention is to divide the produced fluids from the surfactant flood into manageable segments so that each segment can be subjected to those chemical assists that are specific to that segment but much less useful in the treatment of the blended stream. In the present invention, the process embodies the principle of stratifying the surfactant-flooded well stream into three layers: (1) bulk low-water content oil, (2) bulk low-oil content water, and (3) an interface-type liquid loaded with surfactant and surfactant-stabilized oil and water emulsions. The design requirements for processing each one of these three fluid layers are different, so it is an important feature of this invention to accomplish this three-layer stratification effectively. This effective stream stratification requires a hydraulically efficient separation vessel, and such a vessel has been designed in which to implement this process.

First, the produced fluid receiving vessel is designed to achieve good hydraulic efficiency. This vessel is partitioned to maintain a uniform flow channel within the vessel. The flow channel commences in the center of the tank and follows a circular path to the outer portion of the vessel. The flow path is provided at equidistant intervals with structure which has been designated with the registered Trademark PERFORMAX, owned by Combustion Engineering, Inc., to cause excellent vertical stratification and horizontal distribution within each stratified layer in the flow path. The PERFORMAX section can be described as a matrix of flow channels created by corrugated plates that are obliquely aligned with each other. These flow channels provide separate channels for the oil to migrate upward and the water to migrate downward. The small pressure drop in the flow path provided by this matrix causes equal flow in the entire cross section of that path.

One of the earlier contemplated reductions to practice has been proposed for a 10,000 bbl/day surfactant flood production and would require a well stream receiving vessel 40 feet in diameter and 12 feet high. The flow path created inside the tank is designed to give the best possible hydraulic efficiency, with a given cross-sectional area. The length of the flow path provided within the receiving tank would provide a maximum residence time. Ten PERFORMAX sections are equally spaced in the flow path along its length. The long flow path and equal distribution provide the essential ingredients for good flow stream stratification. The only remaining critical need to make this vessel operate satisfactorily is a means of detecting the subtle differences that distinguish the surfactant-rich oil and water mixtures and the water. Another way of expressing the need is to say a dependable means is needed to detect the interface material and then control its accumulation and discharge. It has been determined from laboratory investigation and field trial that a highly sensitive probe, called the C-E Natco Type 783, can detect the difference between surfactant-rich emulsion and the water continuous phase. Likewise, this same probe can be set to detect the difference between the surfactant-rich emulsion and the low surfactant content oil. The installation of two probes mounted vertically apart in the stratifier provides a means of controlling the interface accumulation and discharge. Thus, the combination of a vessel that is hydraulically efficient, that has a long flow path and long residence time, and is provided detection means for the stratified layers in the flow path, permits the design of a system to separate the surfactant-flooded well stream into three available layers.

The low-water, low-surfactant content oil is processed in the conventional manner. This part of the produced fluids is dehydrated in either an electrostatic coalescing vessel, or a long residence time vessel with the aid of a deemulsifying chemical.

The other bulk stream from the well stream stratifier is processed to remove the remnants of oil remaining in this relatively large volume of produced water. This oil and water separation is carried out with the aid of a reverse type emulsion chemical in a hydraulically-efficient vessel much like the PERFORMAX well stream stratifier.

It should be noted, again, that the segregation of the produced fluids into its three layers permits the application of chemicals that are specific for the job to be done in the most efficient way. The deemulsifying chemical for oil dehydration works more effectively in an oil-rich stream. Likewise, the reverse emulsion chemical works more effectively when added to a stream that is predominantly water, rather than an oil and water mixture that is oil-rich.

The dominant element that influences the success of this processing system lies in the ability of the system to isolate and separate the most troublesome of the produced fluids—the liquid that is loaded with surfactant and surfactant-stabilized oil and water emulsions. This stream requires an entirely new and different method of resolving crude oil and water emulsions. It makes for greater overall process effectiveness and efficiency to concentrate this troublesome liquid and work with it, rather than try to work with it when it is blended in with all the other well stream fluids. The special processing of this surfactant-rich emulsion requires the use of a chemical cosolvent, such as isopropanol, that serves as a transport agent to shift the surfactant in the oil and water emulsion into the water phase. Isopropanol is one of a number of organic alcohol compounds that increases the water solubility of the surfactant. The cosolvent works to free up the surfactant that is linked to the oil in the surfactant-stabilized emulsion. The freed surfactant can then be transported into the water phase present. Once the oil portion of this stream is freed of its surfactant, it can respond to a normal water-in-oil emulsion separation process.

In the present process, the surfactant-rich layer of oil is withdrawn from the concentration vessel and placed in a mixing vessel. A sample of the surfactant-rich oil is analyzed for its surfactant content so that the ratio of a cosolvent and fresh water in a solution can be tailored to cause the surfactant to leave the oil and dissolve in the cosolvent and water phase as it is being mixed. Isopropanol is usually the cosolvent of choice because of its relative cost and effectiveness. In contrast to the disclosure of Newcombe supra, who used a nonsaline-tolerant surfactant, it is not necessary to combine the use of partitioning agents and brine to effectively dehydrate the oil. If the surfactant-rich emulsion is concentrated and removed from the other well fluids, that surfactant rich emulsion will require the use of less cosolvent and fresh water to effect a satisfactory separation of the surfactant from the oil, since the surfactant-rich oil and water emulsion is not diluted by the presence of well fluids that do not need the cosolvent and fresh water treatment to make the oil saleable. The concentrated surfactant-rich portion of the well stream fluids can be most effectively and most economically treated as compared to a more dilute stream where the total amount of surfactant to be removed is essentially the same. Newcombe supra reports, in line 50, column 11 of his disclosure, "Merely adding a partitioning agent to an emulsion may not result in any phase separation at all, as shown in one step of Example 4". In Example 4, Newcombe added 35 ml of isopropanol to 202 ml of emulsified oil which is an inadequate ratio to promote the solution of the surfactant in the isopropanol and water. As an example, our experience shows that we can remove the surfactant from an oil containing 40,000 ppm of surfactant with a ratio of one part solution of isopropanol and fresh water (50% to 50%) to one part oil. This ratio is much higher than Newcombe used in his example. This example emphasizes the importance of sampling the surfactant-rich emulsion and determining the surfactant content so the optimum ratio of isopropanol and fresh water to be added into the mixing vessel can be determined.

In the present process, after the proper amount of isopropanol and water is thoroughly mixed with the surfactant-rich emulsion, a separation of the oil (stripped of its surfactant) and the dilute solution of isopropanol and surfactant can be accomplished and the surfactant and isopropanol can be recovered for reuse. The fluids from the mixing vessel are sent to a separation vessel where the oil is removed and sent to a sales tank, and the water containing dilute isopropanol and surfactant is sent to a reclaiming tray-type tower where the heat in the base of that tower drives the isopropanol out the top of the tower as a vapor so it can be condensed for further use. The surfactant remains in the base of the tower in a less dilute condition than when it entered the reclaimer tower. The temperature in the base of the tower can be regulated to provide the surfactant concentration desired for its reuse in further extension of the enhanced oil recovery operation.

In oil production by water flooding, fire flooding, or steam flooding, no externally manufactured surfactant may be employed. When the difficult-to-treat emulsion is isolated there will be no chemical to recover and recycle. Therefore, the subsystem for treating that emulsion may not require a system as complex as just described. An example of subsystems which may be used to treat those emulsions is the diluent recovery system of Francis, et al. U.S. Pat. No. 3,441,499 issued Apr. 29, 1969. The separation of the produced fluids into manageable segments and concentrating the more difficult-to-treat emulsion into a separate segment is essential to that alternate subsystem, just as it is in the surfactant recovery subsystem.

In fire flooding and the processing of the reservoir fluids to resolve the difficult-to-treat emulsions, it is also important to concentrate that emulsion and segregate it from the less difficult-to-treat oil portion of the well fluids because the difficult-to-treat emulsion usually contains finely divided solids that contribute to the stabilization of the emulsion. The resolution of the emulsion often requires chemical additives that can cause the fire solids to become water-wetted so they can be removed from the system. If the solids-stabilized emulsion segment is diluted by other oil emulsion, not solids stabilized, the amount of chemical additives required may increase prohibitively.

SPECIFIC EXAMPLE

In one application of the process that I have studied, the volume ratios that proved satisfactory were as follows:
50 bbls of surfactant interface fluid containing 30,000 ppm surfactant
25 bbls of isopropanol
25 bbls of fresh water
120 ppm deemulsifier chemical (½ gallon)

This mixture was heated to 140° F. and mixed for two minutes at a high speed setting on the mixer.

Reduction To Practice

In a commercial application of this process, it may be desirable to batch-treat the interface stream. That is, accumulate the day's production of the interface material and treat it once per day after an analysis of the surfactant content of the accumulation is determined. The surfactant content of this stream will vary considerably over the life of the reservoir flooding operation. The surfactant content of the stream will determine the ratios of cosolvent, fresh water, and deemulsifier that need to be introduced to obtain a satisfactory separation of this interface material.

After mixing the cosolvent, fresh water, and deemulsifier, the mixture can be separated in an electrostatically-assisted coalescing unit. The dehydrated oil is discharged to oil sales. The surfactant-rich cosolvent and water solution is discharged from the lower portion of the separation vessel into a cosolvent reclaimer vessel. The cosolvent is a relatively expensive material and should be recovered for reuse. The reclaimer vessel is a common distillation tower. Since the purification of the cosolvent is not required to be high quality (it is used as diluent solution) a distillation tower of not over three trays is sufficient.

Since the bottom liquid from this distillation tower contains the surfactant that was in the interface segment of the well stream fluids, the operating conditions of this distillation tower may be governed by the dilution requirements of the surfactant. If the surfactant flood in progress is just a part of a number of step-wise floods for the entire producing field, the surfactant recovered in this process can be reused in another step-wise flood. In a surfactant flood, the cost of the surfactant is a significant portion of the total expense, and its recovery is a very desirable feature of the present invention. The heating requirements of the distillation tower, specifically the bottom temperature, may be influenced by the desired concentration of the surfactant being recovered in this process.

The cosolvent reclaimed from the top of the distillation tower is quite expensive and its reuse to separate the surfactant from the oil is highly desirable. The heating of the distillation tower will be governed by the concentration of surfactant product removed from the bottom of the column, and the clean reclaiming of the cosolvent from the top of the tower. It is expected that the boiling point of the cosolvent will be markedly lower than the water-surfactant solution. It is recognized that the cosolvent may be an azeotropic combination with the water, or co-distill without forming an azeotrope.

The Drawings—FIG. 1

In FIG. 1, a view of the complete system embodying the present invention is somewhat schematically disclosed. The process begins by stratifying vessel 1 receiving the surfactant flood production through conduit 2. Within vessel 1 the production is stratified into three layers. The so-called bulk water is removed from the lower layer or stratum through conduit 3. Oil is removed from the upper stratum through conduit 4. Conduit 5 is also connected through the wall of vessel 1 to remove the intermediate stratum of surfactant-rich emulsion.

The details of stratifying vessel 1 will be subsequently disclosed, together with a description of the function of its internals. For the present, it is disclosed that a single inlet to the vessel is the means for introducing the production from a surfactant flood, and that three layers are defined at the exit of the vessel. A conduit for each layer is connected through the wall of the vessel in order to remove liquid from each layer separately under a control system responsive to the two interfaces between the layers.

Conduit 3 delivers the water and any remnant of oil and/or emulsion to a subsystem 6 with which oil is reclaimed. Conduit 4 delivers the oil with its remnant of water and/or emulsion to a subsystem 7 with which the water remnant is removed to obtain the salable oil which is the end product desired. Conduit 5 delivers the surfactant-rich emulsion to a subsystem 8 in which the surfactant-rich stream is first mixed with a cosolvent and fresh water in a mixer vessel 9 and delivered to a treater/separator 10. In turn, treater/separator 10 delivers the water-diluted mixture of cosolvent and surfactant to a heated reclaimer tower 11 for separation. The cosolvent is discharged from the top of the reclaimer tower, while the surfactant and water are removed from the bottom. The cosolvent reclaimed is returned to storage for further reuse in subsequent separation operations.

In overview, the complete system of FIG. 1 receives the surfactant flood production and first provides for the concentration of the surfactant-rich emulsion as a part of the emulsion layer between the oil and water. The system dehydrates the oil in a first subsystem for sales. A second subsystem cleans the water of oil to a satisfactory degree. The third subsystem functions to reclaim the surfactant by the use of a solution of a cosolvent and fresh water which frees the surfactant emulsion from its oil component and drives the surfactant into the water component of the mixture. Finally, the cosolvent which has broken the oil bond is reclaimed separately from the surfactant, leaving the surfactant to be reclaimed and recycled.

First Subsystem 6

Figure 2:
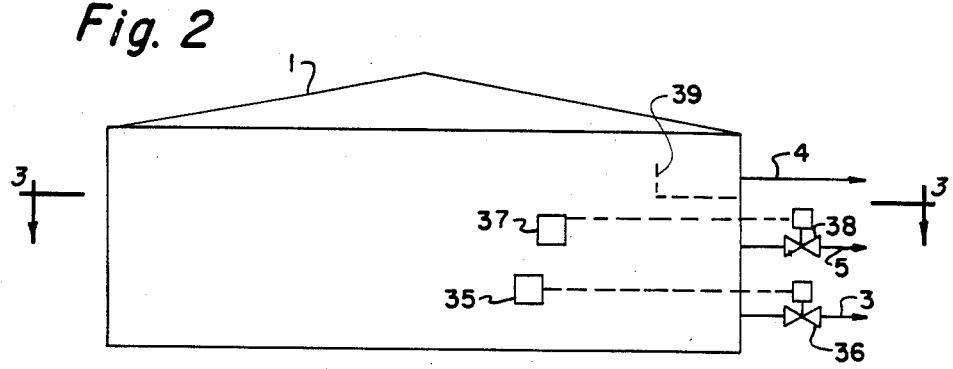
FIG. 2 is an elevation of the stratification vessel of FIG. 1.
Figure 3:
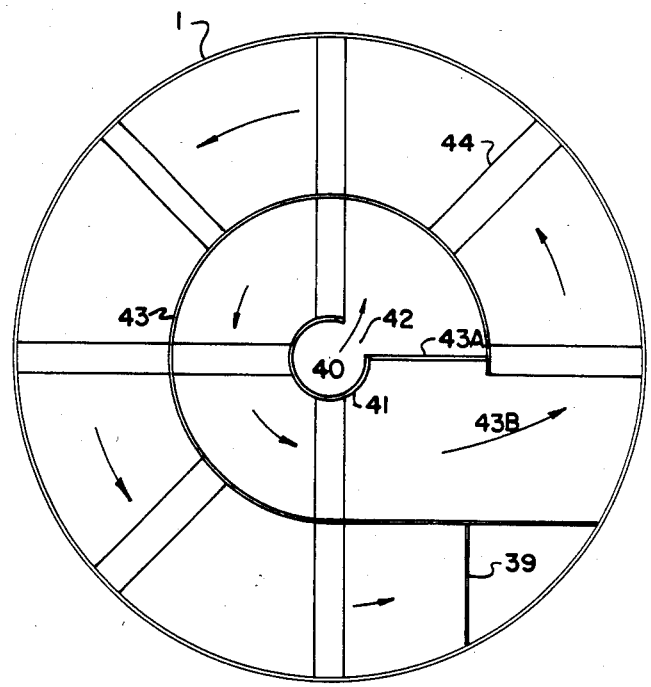
FIG. 3 is a sectioned plan view of FIG. 2 along lines 3—3.

Although dignified by a separator designation, subsystem 6 comprises a vessel much like that shown in FIGS. 2 and 3 that is, in effect, a skimming tank 15. The capacity of tank 15 provides the residence time and long travel path which is essential for the lighter oil and emulsion to form an upper layer above the water. I refer to tank 15 as receiving water from the lower layer or stratum formed in the stratifying vessel 1. The reality is that this bulk water, under the best of conditions, has some remnant of free oil and the emulsion formed by the surfactant, oil, and water.

Skimming tank 15 may accumulate a quantity of oil sufficiently free of water to be combined with the salable oil which is the end product of the complete system. On the other hand, an emulsion may accumulate in the upper layer of tank 15 which should be passed to the subsystem in which the surfactant is to be reclaimed. For the purposes of the present disclosure, a skimming box 16 is disclosed as removing an upper layer from the liquids received by tank 15 and generally designating the outlet from the box as being oil.

Whatever additional chemical treatment of the liquids in tank 15 may be desired falls into the area of standard oil field practice. It may be that the water withdrawn from the bottom of tank 15 through conduit 17 is cleaned of oil and emulsion to the degree that it can be disposed of or used for some purpose not within the scope of the present disclosure. Subsystem 6 is limited to indicating that there is bulk water to be received from the lower stratum of vessel 1 and processed in the manner described.

Subsystem 7

Subsystem 7 is about as elemental as subsystem 6 in its processing of the bulk oil from the upper stratum of vessel 1. The liquid withdrawn from this upper stratum is designated as oil, but with the recognition that it contains a remnant of water and emulsion. The water and emulsion must be reduced to some degree specified by the customer to become salable as the end product of the overall system. Subsystem 7 is dominated by a so-called treater 20. As an example of treater structure satisfactory for this subsystem, reference is made to the disclosure of Prestridge, U.S. Pat. No. 3,772,180, issued Nov. 13, 1973. There are many variations in treaters which dehydrate oil. This art of dehydration is in continuous evolution. For the purposes of the present disclosure, the electrostatic coalescing section and heater of the Prestridge patent serves as representative of satisfactory dehydration which could be used as indicated at 20.

If the oil and/or emulsion from tank 15 is reasonably compatible with the feed to treater 20, it could be routed to the input of treater 20 and comingled with the oil withdrawn from the upper stratum of vessel 1. Treater 20 is to dehydrate its input oil to the degree that it becomes salable oil as the end product of this complete system discharged through conduit 21.

Subsystem 8

Subsystem 8 receives its input through conduit 5. As previously disclosed, this input is the liquid drawn from the intermediate layer of stratifying vessel 1. Also, as previously disclosed, this emulsion of oil, water, and surfactant is placed in mixing vessel 9. Many of the details of the chemistry involved need not be disclosed. Basically, a supply of isopropanol is established at 25 and the amount of this material drawn from storage 25 is passed through conduit 26 into the mixing vessel. The volumetric ratio of this so-called cosolvent is established by sampler 5a which removes a sample and analyzes the quantity of surfactant in the emulsion conducted through conduit 5. Whatever volume proportion of cosolvent and surfactant emulsion is determined as satisfactory, mixing vessel 9 brings them into intimate contact so the cosolvent may break the bond of the oil component of the emulsion and cause the surfactant to be dissolved into the water phase of the emulsion. As an example, our experience shows that we can remove the surfactant from an oil containing 40,000 ppm of surfactant with a ratio of one part solution of isopropanol and fresh water (50% to 50%) to one part oil.

The charge of isopropanol is indicated as supplied from storage vessel 25. A supply of this chemical is added to storage 25 as makeup for chemical losses from reclaimer tower 11. In all events, the isopropanol is supplied from vessel 25, as a solution with fresh water from storage vessel 27, and there emerges from mixer 9 a mixture of chemically released oil, and surfactant and cosolvent dissolved in water. This mixture is drained from mixer 9 through conduit 28 and routed to treater/separator 10 for separation of the oil from the emulsion of cosolvent, surfactant, and water.

Treater/separator 10 may be a different size from treater 20 and of a different type. Basically, it will separate the oil from the water phase containing the dissolved cosolvent and surfactant. The oil released from the emulsion is discharged from treater 10 through conduit 29 and routed to sales, along with the output of treater 20. The water and cosolvent and surfactant is passed to reclaimer tower 11 through conduit 30. Any cosolvent selected to drive the surfactant from its bond with oil and into the water phase will have a significantly lower boiling point than that of water or surfactant. Therefore, heat applied to the bottom of reclaimer tower 11 will first vaporize the cosolvent and thereby separate it from the surfactant and water. Of course, the cut will not be a sharp as theoretically desired, some water will distill with the cosolvent, combining as an azeotrope, or as a co-distillate. The discharge from the upper part of tower 11 is indicated at 31. Cooling of this vapor will condense it to a liquid suitable for storage in vessel 25 from which it will be recycled into mixing vessel 9. Any loss of this chemical in its circuit may be made up from fresh cosolvent added to storage 25. The remaining surfactant diluted in water in the lower portion of tower 11 is routed through conduit 32 for reuse in flooding the oil producing formation.

Summation

At this point in the disclosure, one broad aspect of the invention is taught in both process and structural terms. As a process, the production from the surfactant flood is stratified into three layers to concentrate the surfactant in the intermediate layer. This concentration enables the recovery of the surfactant to be made efficiently. The surfactant is a costly product and must be recycled to the flood for economic reasons. The surfactant-rich emulsion drawn from the intermediate layer of the stratified production is mixed with a solution of cosolvent and fresh water which breaks the bond between the oil and the surfactant-water component of the emulsion. The oil thus released can be added to the sales. The process continues with reclaiming the surfactant and cosolvent. Economical recovery is provided by the use of a trayed tower which is heated to drive off the cosolvent, or its azeotrope with water. The remaining surfactant dissolved in water is thereby recovered and recycled to the flood while the cosolvent is recycled to continue breaking the bond between oil and surfactant-water emulsion. The apparatus in which this process is carried out has been specifically disclosed and interrelated.

Stratification Vessel 1

The elevation of FIG. 2 and the plan view of FIG. 3 are to be considered together in disclosing the structure and function of this unique vessel. FIG. 2 discloses the relationship between the outlet conduits 3, 4 and 5 which penetrate the vessel wall in order to withdraw fluid from each of the three stratified layers. FIG. 3 is a plan view of the vessel sectioned to show the interior of the vessel in disclosing the elongated flow path in which the surfactant flood production is stratified.

In FIG. 2, a first level-sensing device 35 is mounted through the wall of the vessel a predetermined distance above the vessel bottom. A level-detecting device suitable for this purpose is marketed by Combustion Engineering, Inc. with the present designation of C-E Natco 783 Liquid Level Control. This sensing device determines the absence or presence of the interface between the bulk water layer from which conduit 3 withdraws the water to subsystem 6, and the intermediate layer from which conduit 5 withdraws emulsion for the subsystem 8. Control by this level-sensing device 35 is applied to valve 36 to maintain the interface between these two lower strata a predetermined height above the bottom of vessel 1.

A second level-sensing device 37 is mounted through the wall of vessel 1 a predetermined distance above level-sensing device 35. Admittedly, a sharp interface does not exist for this device to sense, but a predetermined cut of surfactant-rich emulsion can be sensed by this device and its control exerted on valve 38 in conduit 5. If the difficult-to-treat emulsion does not contain a surfactant to be recovered, the second level-sensing device will still detect a certain cut to establish an upper "interface" between the intermediate layer and the upper layer.

By the foregoing sensing and controlling by devices 35 and 37, the height of the two lower stratified layers can be maintained. The height of the upper layer of bulk oil is established by the height of a skimmer 39 which feeds the oil into upper conduit 4. Thus, the surfactant flood production stratified within vessel 1 is separated and withdrawn through three conduits, 3, 4 and 5, for processing in the three subsystems. The detailed function of vessel 1 in stratifying the production can now be disclosed.

The Elongated Flow Path

In the stratifying vessel which is the structural raison d'etre of the inventive concepts I have disclosed, the elongated flow path within this vertically extended cylindrical vessel is the heart of the concepts. In general, I have established a circular flow path within the vessel with a hydraulic efficiency which produces the required stratification. By hydraulic efficiency I mean the relationship between the volume of fluids flowing through the elongated flow path, and the time required for an increment of the fluids to traverse the path. Conduit 2 connects with the first end of this flow path and conduits 3, 4 and 5 connect with the other end of the flow path. Between this inlet and the outlets is an elongated flow path in which I have mounted a plurality of coalescing structures which enhance the stratification, while also providing a differential pressure which urges even distribution of the material in each stratified layer.

Referring to FIG. 3, a chamber 40 is formed axially in vessel 1 by baffle 41. Inlet conduit 2, not shown in FIG. 3, extends down into chamber 40 to deliver the production liquids. An opening 42 is in the side of chamber 40 through which the production liquids flow from the chamber. A path is formed between a baffle 43 and baffle 41. The first end of this path is established by baffle 43a extended from baffle 41 to baffle 43; therefore, the production liquids flowing from opening 42 are caused to flow in the circular path between baffles 41 and 43. This flow of the production liquids enters the last segment of the circular flow path at demarkation point 43b. It can be said that the flow path extends from opening 42 to the juncture with the flow path formed between baffle 43 and the vessel wall. The transition between the first and second segments of the flow path is at point 43b. This circular flow path segment between baffle 43 and the vessel wall terminates at the level-sensing devices and output conduits 3, 4 and 5 (not shown). Thus, a tremendously elongated flow path is formed within vessel 1.

I have disclosed coalescing sections 44 at even intervals along the flow path. These coalescing sections may be formed of the media packed material presently marketed by Combustion Engineering, Inc. under the Trademark PERFORMAX. These structures provide impact surfaces for the production liquids traveling the length of the flow path and consistently enhance the coalescence of the water into a lower layer, oil into an upper layer, with the intermediate layer of surfactant-rich, or other difficult-to-treat, emulsion as previously discussed. Additionally, the media packs are sized so that the differential pressure developed across them will enhance even distribution of the stratifying liquids across the width of the flow path between the baffles. Vessel 1, shaped and baffled as disclosed in FIGS. 2 and 3, functions to effectively coalesce and stratify the components of the surfactant production in order to effectively produce salable oil from the processing subsystems, while recovering the surfactant and cosolvent for recycling.

Conclusion

Again, in grand review, the surfactant flood produces an emulsion. The produced emulsion is not only of oil and water, but may include a surfactant which needs to be recovered at the same time oil is produced as a salable product.

The first step in oil production and surfactant recovery is the stratification of the complete stream to concentrate the surfactant-rich portion of the emulsion so that it can be processed. An elongated flow path in the stratifying vessel is provided to stratify the stream into three layers. Coalescing structure is mounted at intervals along the elongated path to urge the stream into stratification. The intermediate layer of the stratifying stream has the surfactant concentrated. Control is exerted over the discharge of each of the three layers so that salable oil can be produced from the upper layer, and the surfactant-rich emulsion can be produced from the intermediate layer.

A separate subsystem for processing fluid from each of the three layers is provided. Salable oil is produced from the subsystem for the upper layer, while the water from the lower layer is processed to clean it of oil and emulsion which can be routed to the processes for the other two layers. Finally, the intermediate layer is processed to recover the surfactant for reuse while a cosolvent required in the process for the recovery of the surfactant is recycled for continuous use in surfactant recovery. Again, it is emphasized that the intermediate layer may not contain a surfactant, but may simply be comprised of concentrated difficult-to-treat emulsion which can be drawn off for special handling in a processing subsystem tailored to perform separation of the oil and water.

In oil production by water flooding, fire flooding, or steam flooding, no surfactant may be employed. When the difficult-to-treat emulsion is isolated there will be no chemical to recover and recycle. Therefore, the subsystem for treating the intermediate layer may not require a system as complex as subsystem 8. An example of subsystems which may be used to treat the intermediate layer is the diluent recovery system of Francis, et al. U.S. Pat. No. 3,441,499 issued Apr. 29, 1969. The stratification of the produced fluids into manageable segments and concentrating the more difficult-to-treat emulsion into the intermediate layer is essential to this alternate subsystem, just as it is in the surfactant recovery subsystem.

From the foregoing, it will be seen that this invention is one well adapted to attain all the ends and objects hereinabove set forth, together with other advantages which are obvious and inherent to the method.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. Producing a well stream of oil and water by injecting a saline-tolerant surfactant into the formation which forms an emulsion with a portion of the oil and water,
   separating and concentrating the surfactant-rich emulsion from the well stream,
   analyzing the surfactant-rich emulsion to determine the optimum ratio of cosolvent and fresh water to be used to break the bond of the oil and dissolve the surfactant into the water,
   forming a solution of cosolvent and fresh water in accordance with the analysis,
   mixing the solution of cosolvent and fresh water with the saline-tolerant surfactant-rich emulsion of the well stream to break the bond of the oil and dissolve the surfactant into the water,
   separating the water and cosolvent and surfactant from the oil of the surfactant emulsion,
   vaporizing the cosolvent from the surfactant and water for recovery and reuse,
   and recycling the surfactant and water for reuse.

2. The process of claim 1, in which, the cosolvent is isopropanol.

3. A system for treating an emulsion containing oil and water and saline-tolerant surfactant from oil well fluids received from a formation which has been chemically flooded, including,
   a mixing vessel receiving an emulsion of oil and water and saline-tolerant surfactant through a conduit,
   a means connected to the conduit for analyzing the surfactant content of the emulsion to determine the optimum ratio of cosolvent and fresh water to be used to break the bond of the oil and dissolve the surfactant into the water,
   a source of cosolvent,
   a source of fresh water,
   a connection between the sources of cosolvent and fresh water to form a solution,
   a conduit between the connection and the mixing vessel to introduce the solution into the mixing vessel,
   a separating vessel connected to the mixing vessel in which the oil is separated from the mixture of water and cosolvent and surfactant,
   a reclaimer tower connected to the separating vessel to receive the mixture and vaporize the cosolvent from the mixture for reuse in the mixing vessel,
   and means connected to the reclaimer tower for conducting the mixture of water and surfactant for reuse.

* * * * *